July 20, 1954     E. W. SPRINGER     2,683,987

METHOD OF ASCERTAINING UNKNOWN DATA

Filed Jan. 2, 1946     3 Sheets-Sheet 1

Inventor
EARL W. SPRINGER

By M.O.Hayes

Attorney

July 20, 1954  E. W. SPRINGER  2,683,987
METHOD OF ASCERTAINING UNKNOWN DATA
Filed Jan. 2, 1946  3 Sheets-Sheet 2
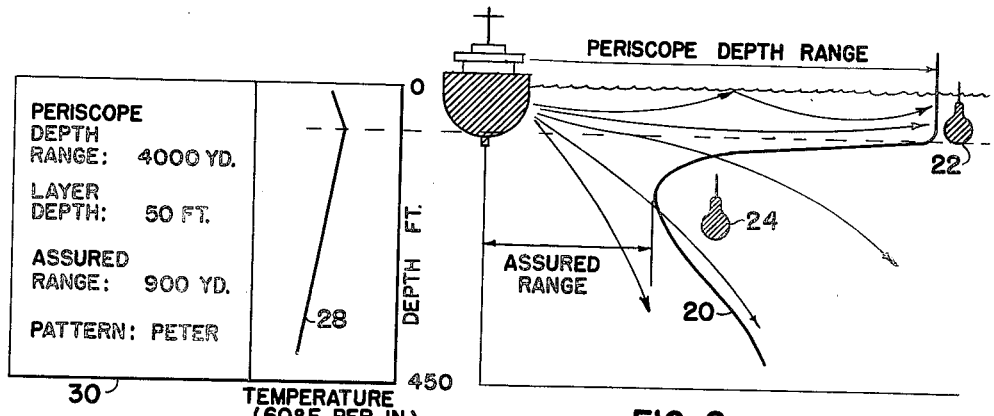
FIG. 7
FIG. 8
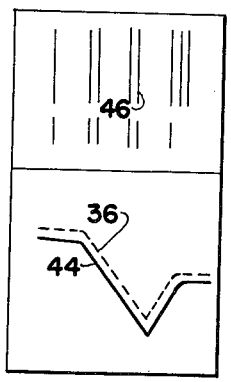
FIG. 10
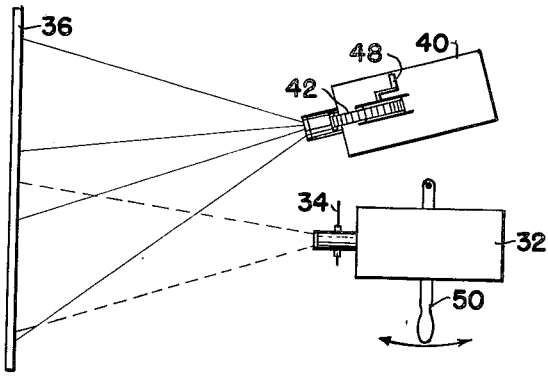
FIG. 9
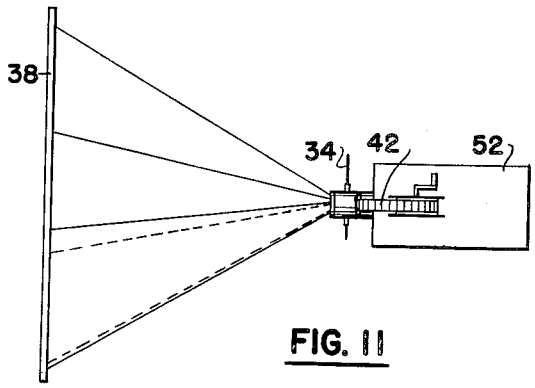
FIG. 11
Inventor
EARL W. SPRINGER
By M. O. Hayes
Attorney July 20, 1954   E. W. SPRINGER   2,683,987
METHOD OF ASCERTAINING UNKNOWN DATA
Filed Jan. 2, 1946   3 Sheets-Sheet 3

Inventor
EARL W. SPRINGER

By M. O. Hayes

Attorney

Patented July 20, 1954

2,683,987

UNITED STATES PATENT OFFICE 2,683,987

METHOD OF ASCERTAINING UNKNOWN DATA

Earl W. Springer, Indianapolis, Ind.

Application January 2, 1946, Serial No. 638,694

1 Claim. (Cl. 73—339)

(Granted under Title 35, U. S. Code (1952), sec. 266)

This invention relates to optical projection means for the comparison of observed data with standard data. More particularly this invention relates to a means for comparing an observed trace of temperature versus depth with standard traces of known characteristics.

Successful use of underwater sound detection equipment depends upon the power output of the projector equipment in the direction of the target, the amount of sound reflected by the target to the receiving equipment, and upon the spreading and weakening of the sound beam as it travels from projector to the target and back again. If the characteristics of the underwater sound equipment and the reflection characteristics of a target are known it remains to predict the spreading and weakening of the sound beam under various thermal conditions.

If the temperature of the water did not vary with depth, the sound rays would travel in straight lines since the velocity of sound would be roughly the same at all depths. Under such conditions a given detection range could be realized regardless of the depth of the target. Unfortunately, however, the velocity of sound is not the same at all depths. The velocity of sound in sea water increases from 4700 feet per second to 5300 feet per second when the temperature increases from 30 degrees F. to 85 degrees F. Because of temperature gradients, sound rays do not travel in straight lines but follow curved paths and are bent, or refracted, away from levels of high temperature and high sound velocity toward levels of low temperature and low sound velocity. Where the temperature decreases with depth the sound rays are curved downwardly, and the targets near the surface may be detected only at close range. Where the temperature of the water increases with depth, which sometimes occurs where a warm body of water during the mixing process forms a layer over a colder body, the sound rays are bent upwardly towards the surface and targets located below the "layer depth" are hidden except at short range.

In order to predict the capabilities of under water sound or echo equipment under a given set of thermal conditions, it is necessary to know the variation of temperature with depth in the area in which the operation is taking place. Range information obtained from the temperature-depth characteristics determines the condition under which sound equipment must advisedly be used, for example, the spacing of the vessels forming an under water search screen.

In order to obtain the temperature-depth characteristics a device known as the bathythermograph is lowered into the water producing a temperature-depth trace on a piece of smoked glass or similar backing. Such traces after recovery are interpreted by the use of charts, tables, special slide rules and the like. Such interpretation is subject to a number of disadvantages, particularly, where the results of the interpretation must be quickly and accurately determined which is necessary in naval practice. Existing means of interpretation are slow since they are comprised of a number of steps. In addition they are necessarily approximate, leading to results of a low order of accuracy. Proper interpretation in addition depends upon the training and experience that the operator or the reader has acquired. Another disadvantage resides in the fact that only one operator under normal circumstances makes the interpretation and results are therefore subject to misinterpretation by such operator.

It is an object of my invention to provide means for rapid interpretation of bathythermograph traces.

Another object of my invention is to provide means which will enable the interpretation of a temperature-depth trace more accurately and with less chance for error than previous methods of interpretation.

It is a further object of my invention to enable an interpretation of temperature-depth data by untrained and inexperienced personnel.

It is still another object of my invention to provide a device for interpreting traces by comparison with standard traces, which device is sufficiently light and small as to enable mounting on naval vessels.

It is yet another object of my invention to provide means for interpreting traces which is adaptable to electrocardiograph traces or other traces of known characteristics.

In the drawings:

Figure 7 is another example of a slide containing a standard curve and its data;

Figure 8 shows the range of the detection equipment under the conditions corresponding to the slide illustrated in Figure 7;

Figure 9 shows the projection analyzing means corresponding to one embodiment of my invention;

Figure 10 illustrates the image cast upon the screen by the analyzing equipment;

Figure 11 shows one way in which my invention may be practiced by the use of a single projection;

Figure 13:
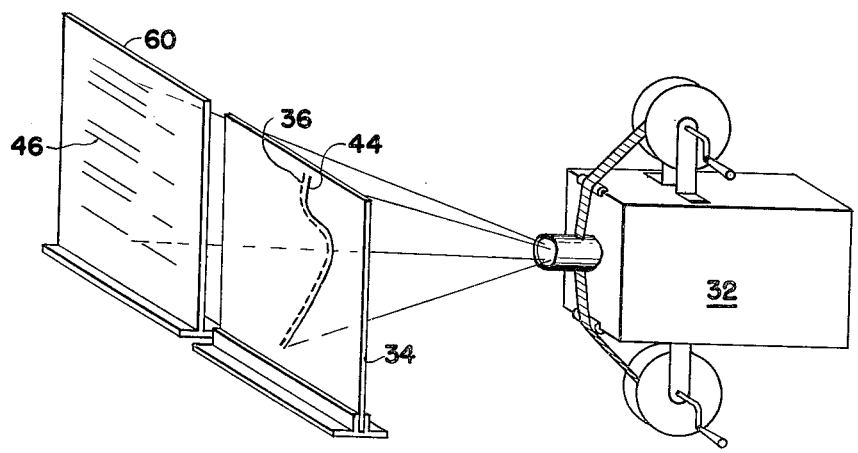

Figure 13 disclose still another embodiment in which a standard trace is projected upon the slide containing the observed trace.

Figure 1:
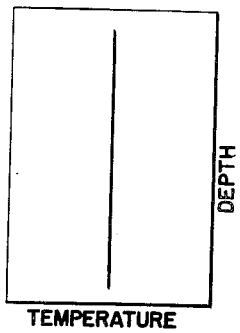
Figure 1 shows a temperature-depth trace under conditions of constant temperature.
Figure 2:
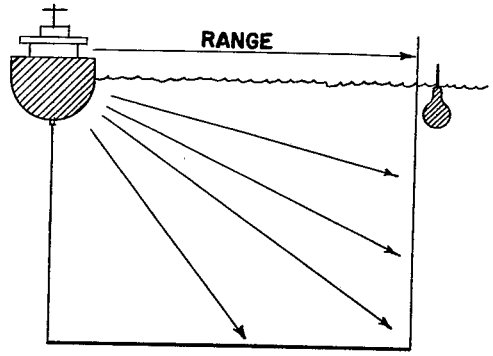
Figure 2 shows the direction of propagation of the sound rays under the constant temperature conditions.
Figure 3:
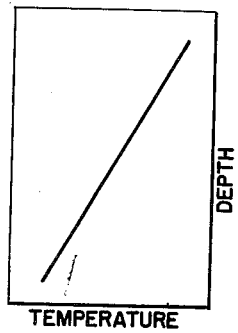
Figure 3 shows a temperature-depth trace under conditions of negative temperature gradient.
Figure 4:
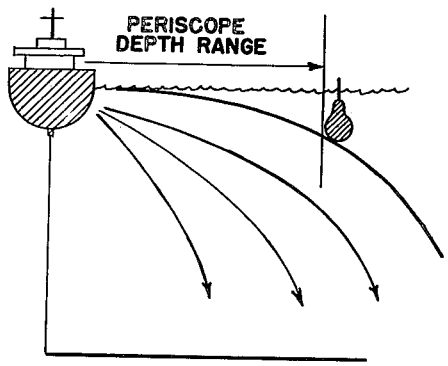
Figure 4 illustrates the bending of the sound rays under the conditions corresponding to the trace of Figure 3.

Figure 2 illustrates that the range is practically independent of depth where the temperature of the water is the same at all points. Figure 4 shows the downward bending of the sound rays under negative temperature gradient conditions. The conditions corresponding to Figures 2 and 4 rarely exist and traces shown in Figures 1 and 3 are normally not obtained by bathythermograph equipment. The traces shown in Figures 5 and 7, however, are typical of the temperature-depth traces obtained in practice. In the Figures 6 and 8 the region to the right of the heavy line 20 cannot be reached by the underwater detection gear, and submarines located at positions 22 and 24 are effectively out of the range of the detection apparatus.

Figure 5:
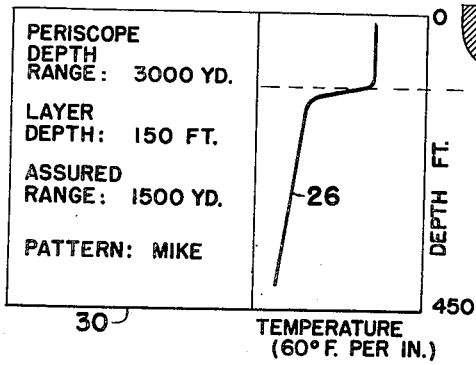
Figure 5 shows a frame or slide of a standard curve or trace and the associated data.
Figure 6:
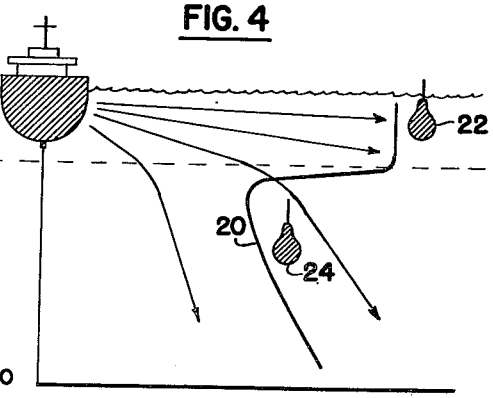
Figure 6 shows the range at various depths under the conditions corresponding to the slide of Figure 5.

The traces 26 and 28 shown in Figures 5 and 7 respectively are but two of several hundred possible observed traces corresponding to a wide variety of underwater thermal conditions. The wide variety of the conditions encountered makes it advisable that the burden of interpretation be removed from the operator or reader of the observed trace. I therefore propose that a large number of standard traces be prepared beforehand, for example on slides or frames 30. Because of the large number of traces required to cover the possible existing thermal conditions, I prefer to include the data of slides 30 on consecutive frames of movie film suitable for use in a microfilm projector. The curves are preferably included on the film in proper order or rotation so that the variation from one curve to the curve existing on adjacent frames occurs in small increments.

My invention will be more completely understood by a description of the embodiment illustrated in Figure 9. In this figure the numeral 32 represents a projector suitable to receive a slide 34 bearing an observed trace of temperature versus depth. The image 36 of the trace is thrown upon a screen or receiving surface 38. An additional projector 40 equipped with a roll of film 42 of standard traces and accompanying data projects a trace 44 on the screen 38. Simultaneously the data corresponding to the curve 44 is cast upon the screen in the area 46. In operation the observed trace 36 is first cast on the screen and a sample trace 44 cast on the screen in adjacent or superimposed relation for purposes of comparison. The frames may be advanced one by one, for example by means of crank 48, until a curve is found which is substantially congruent with the observed trace. The observed trace data may then be immediately read from the area 46. The matching may require that the two curves be movable with respect to one another. To enable such adjustment, adjusting means 50 controlling angular rotation of either of the projectors may be used. For purposes of comparing the observed trace with a standard trace, it is not necessary that the size of either image must be adjusted for each comparison; since the relative size of the curves or traces 36 and 44 may be initially adjusted, however, by axial movement of one or both of the projectors.

In the embodiment of my device shown in Figure 11 the same optical system is used for projecting both the observed trace and the sample trace on the screen. While this method requires only one projector, which is advantageous on shipboard, nevertheless, it is not quite as flexible as the arrangement shown in Figure 9. It will be necessary to use a film having standard traces of the same size as the observed traces if both the observed and standard traces are placed in the same focal plane.

Figure 12:
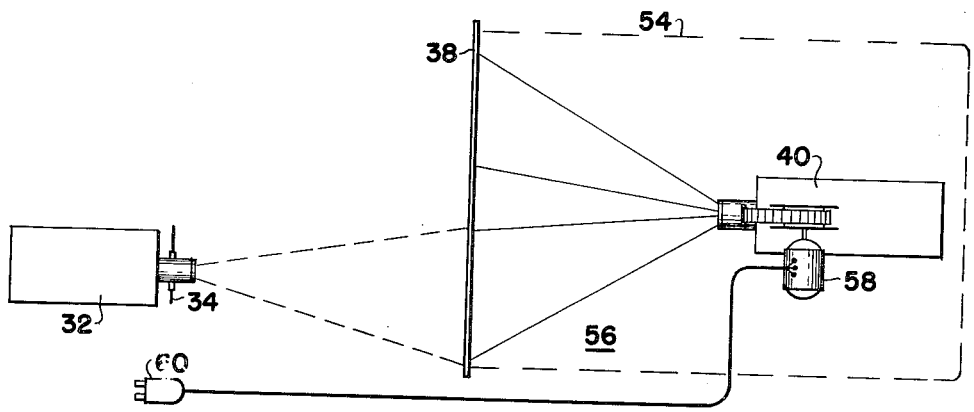
Figure 12 illustrates another embodiment of my invention in which a translucent screen is used, enabling two projectors to be placed on opposite sides of the screen.

In Figure 12 I have shown an arrangement in which the observed trace and the standard trace and its associated data are projected onto a translucent screen from the opposite sides. This arrangement enables the projector 40 associated with the film containing the standard traces to be mounted in a housing 54. If desired the size of such housing may be reduced, for example by mounting the projector 40 in the region 56 and providing appropriate reflecting means interposed between the projector 40 and the screen 38.

In order to facilitate the shifting from one frame to the frame adjacent, a driving means 58 may be provided to drive the film containing the sample traces. Such means may, for example, consist of an electric motor arranged to advance the film frame-by-frame in rapid succession under the control of a reversing type pushbutton 60 in a manner well known in the control of motors. In my prefererd embodiment the pushbutton control is of such a nature that the speed of the driving means is under the control of the operator. This control may be accomplished by variable resistance inserted in the motor circuit, by the adjustment of a mechanical governor or the like. If desired the speed control resistance may be inserted in the same housing in which the pushbutton 60 is contained.

In Figure 13 is shown an embodiment in which the slide 34 containing the observed trace 36 serves in itself as a screen to receive the projection of the standard trace 44. The projector 32 may be of the same type shown in Figures 9 and 11 already discussed. The portion 46 of the projected frame is received on an auxiliary translucent screen 60 placed adjacent the slide 34. In order that the projected trace be visible through the smoked or semi-opaqued surface of the slide, it is necessary that the prepared surface of the slide 34 be sufficiently translucent to permit the standard trace 44 to be seen.

It has been found that observed temperature depth traces are readily classified into five pattern types. The standard traces falling under each of these types are preferably grouped in the same portion of the film. Thus it is possible for the operator to note into which pattern category the trace falls and to speed up the driving means 58 until the appropriate region of the film is reached. The process of comparison may then proceed on a frame-by-frame basis at a slower rate until a proper match has been obtained. The accuracy of such match may then be instantly checked by observation by the responsible individual in charge of the reading.

In a practical application data corresponding to the trace may include the periscope depth range, the layer depth, the assured range and the pattern classification as illustrated in Figures 5 and 7. Normally this data is immediately transmitted by radio or other means to other ships containing underwater sound equipment which are not, however, equipped with bathythermograph apparatus. Because of the dependence of other ships upon the ship containing the trace-analyzing apparatus, it is particularly necessary that such readings be obtained quickly and accurately.

In view of the above it will be seen that my method of analysis is particularly well adapted to underwater sound problems. I wish to point out however, that this method of analysis is also well adapted to the reading of traces obtained on medical diagnostic equipment, for example, an electrocardiograph. At the present it is necessary for electrocardiograph traces to be analyzed by a person having broad knowledge and experience of heart disease and associated disorders. It will be obvious that the specialist may leave the interpretation of such readings to his untrained medical assistant if projection analyzing apparatus and standard traces corresponding to various heart conditions are used in a manner completely analogous to that just discussed.

It will be seen from the above that I have produced a method of and apparatus for quickly and accurately analyzing data which formerly required the exacting attention of an operator with much training and experience. It will further be seen that the arrangement which I have disclosed utilizes apparatus which is inexpensive to construct and easy to maintain. Since film such as microfilm when used in a properly built projector is practically indestructible, it will be obvious that replacement of the film will rarely be necessary. Because of the well-known splicing techniques additions may be easily made at any point in the series of standard traces.

While the invention is susceptible of various modifications and alternative constructions, I have shown in the drawings and have described herein only the preferred embodiments. It is to be understood, however, that I do not aim to limit the invention by such disclosures, for I aim to cover all modifications and alternative constructions falling within the spirit and scope of the invention as defined in the appended claim.

The invention described herein may be used by or for the Government of the United States for governmental purposes without the payments of any royalties thereon or therefor.

What is claimed is:

A method for determining the effective range of sound transmission through water by underwater sound apparatus comprising the steps of obtaining a temperature-depth trace by submerging a bathythermograph into the water region through which the sound transmission is to be propagated, projecting upon a screen the obtained temperature-depth trace, projecting upon said screen a series of standard temperature-depth charts of predetermined sound range characteristics having incremental differences in characteristics between successive traces depicting possible underwater thermal conditions in succession and in superimposed relation upon the projected image of the obtained temperature-depth trace, comparing the projected image of the obtained temperature-depth trace and the projected images of said standard temperature-depth traces, and selecting a standard temperature-depth trace having a shape substantially identical to the obtained temperature-depth trace, whereby the predetermined sound range characteristics associated with the selected standard temperature trace are applicable to the water region through which sound is to be propagated.

References Cited in the file of this patent

UNITED STATES PATENTS

| Number | Name | Date |
|---|---|---|
| 595,541 | Hollen | Dec. 14, 1897 |
| 1,285,857 | Welch | Nov. 26, 1918 |
| 1,394,797 | Smith | Oct. 25, 1921 |
| 1,421,042 | Twyman | June 27, 1922 |
| 1,424,556 | Cooke | Aug. 1, 1922 |
| 1,703,933 | Hartness et al. | Mar. 5, 1929 |
| 1,789,009 | Luce | Jan. 13, 1931 |
| 2,035,780 | Beardsley et al. | Mar. 31, 1936 |
| 2,155,248 | Adams et al. | Apr. 18, 1939 |
| 2,192,529 | Thomas et al. | Mar. 5, 1940 |